US009648295B2

(12) United States Patent
Sharma et al.

(10) Patent No.: US 9,648,295 B2
(45) Date of Patent: May 9, 2017

(54) SYSTEM AND METHODS FOR SIMULTANEOUSLY CAPTURING AUDIO AND IMAGE DATA FOR DIGITAL PLAYBACK

(71) Applicants: Pankaj Sharma, Lorton, VA (US); Rakhi Sharma, Lorton, VA (US)

(72) Inventors: Pankaj Sharma, Lorton, VA (US); Rakhi Sharma, Lorton, VA (US)

(*) Notice: Subject to any disclaimer, the term of this patent is extended or adjusted under 35 U.S.C. 154(b) by 0 days.

(21) Appl. No.: 14/804,155

(22) Filed: Jul. 20, 2015

(65) Prior Publication Data

US 2016/0100149 A1    Apr. 7, 2016

Related U.S. Application Data

(60) Provisional application No. 62/026,401, filed on Jul. 18, 2014.

(51) Int. Cl.
H04N 9/82 (2006.01)
H04N 1/21 (2006.01)
G03B 31/06 (2006.01)
H04N 9/806 (2006.01)

(52) U.S. Cl.
CPC .......... *H04N 9/8211* (2013.01); *G03B 31/06* (2013.01); *H04N 1/2112* (2013.01); *H04N 9/806* (2013.01)

(58) Field of Classification Search
None
See application file for complete search history.

(56) References Cited

U.S. PATENT DOCUMENTS

| | | | |
|---|---|---|---|
| 6,332,030 B1* | 12/2001 | Manjunath | G06T 1/0028 382/100 |
| 2005/0212930 A1* | 9/2005 | Sim | G06T 1/0028 348/231.4 |
| 2013/0016211 A1* | 1/2013 | Yeh | E06B 7/30 348/143 |
| 2014/0325354 A1* | 10/2014 | Zhang | G06F 3/04842 715/716 |
| 2015/0369554 A1* | 12/2015 | Kramer | F41A 17/063 386/227 |

* cited by examiner

*Primary Examiner* — Shahbaz Nazrul
(74) *Attorney, Agent, or Firm* — Attentive Law, PLLC; Paul Ratcliffe

(57) ABSTRACT

The invention provides for a system and method for the simultaneous capturing and storage of digital audio data in association with still image data. The captured audio clip is instantaneously associated and embedded with the photographic image, and allows for the user to digitally play back, view, and share the still image embedded with the audio clip.

17 Claims, 3 Drawing Sheets

SYSTEM AND METHODS FOR SIMULTANEOUSLY CAPTURING AUDIO AND IMAGE DATA FOR DIGITAL PLAYBACK

RELATED APPLICATION

This application claims priority to U.S. Provisional Patent Application 62/026,401 filed on Jul. 18, 2014, entitled "System and Method for Simultaneously Capturing and Generating Audio and Image Data for Digital Playback", the entirety of which is incorporated herein.

BACKGROUND OF THE INVENTION

Field of the Invention

The present invention relates generally to the field of digital image and digital audio data capture, storage, and playback. More specifically, the invention relates to a mobile application that simultaneously records an audio clip while taking a still picture. The audio clip is instantaneously embedded with the photographic image allowing for users to view the image, digitally play back the audio file and share with third-parties the image embedded with the audio clip. The other advantage of this invention is that the Original format of the picture and audio can be retained, so that they can be used independent of each other if needed.

SUMMARY OF THE INVENTION

This summary of the invention is provided to introduce concepts in a simplified form that are further described in the detailed description of the invention. This summary is not intended to identify key or essential inventive concepts of the claimed subject.

The present invention provides a system and method for the simultaneous capture and storage of digital audio data in association with still image data. The captured audio clip is instantaneously associated and embedded with the still image data, and allows for the user to digitally play back, view, and share the still image embedded with the audio clip (hereinafter referred to as an "embedded audio image"). The present invention does not require post-processing of the audio and image data captured in order to associate the data.

The system instantaneously captures the surrounding sound associated with a single frame, still image at a given moment of time. The amount of time that the audio data will be recorded may be predetermined or controlled manually by the user. The manual control may be in real time by a user selecting to initiate and end recording or by establishing settings indicating the amount of recording time to capture before and post photo capture. The system will initiate the recording of the audio data surrounding the capturing of a still image by detecting common events that lead up to the moment of snapping a still image.

Once the photograph has been taken, and the audio data recorded, this captured data is then stored on the same media by utilizing a computerized process and method. In the present invention, that media will be the memory of the apparatus in which the mobile application is downloaded onto or a remote cloud-based computer system incorporating one or more servers and storage/memory.

The embedded audio image can be played back on the device that captured the data or another third-party device. The playback can be in the form of a slideshow where each picture is displayed based on the length of sound recorded for each picture. Additionally, the user of the system may advance through the embedded audio pictures manually. When manually viewing the pictures, the user will have the option for the audio to automatically play when the picture is displayed or manually initiate the audio portion of the image.

The present invention also allows for users to share with third-parties the combined picture and audio data with third parties by exchanging data through WiFi, Bluetooth, IrDA, TCP/IP, and other communication protocols. The preferred embodiment of the present invention also allows users to locate and identify pictures based on voice recognition. By detecting a voice and reading the signature of the voice, the system can find pictures that contain the voice. Furthermore, the system can recognize a voice or voice commands such that users can audio tag images (embedded or connected to audio files) so retrieve images with the same audio tag (i.e. "Zoo" to pull up images audio tagged with the word "zoo" taken during a trip to the zoo.

The present invention also provides a portable device comprising: an audio input device operative to capture audio signals; an image input device operative to capture an image; a motion detection device operative to detection motion of the portable device, and a processor connected to the audio input device, the image input device, and the motion detection device, wherein the processor is operative to: initiate the capturing of audio signals by the audio input device upon receiving a detection of motion signal by the motion detection device; receive input from a user to capture an image, initiate the capture of an image by the image input device; store the image data on the portable device; terminate the capturing of the audio signal; and save the captured audio on the portable device. The audio input device may be a microphone, the image input device may be a camera, and the motion detection device may be an accelerometer. The device may process the audio data or file and embed the audio into the image file. Alternatively, the mobile device may transmit the image and audio file for processing off of the device. A user can use the device to display the image data on the device while simultaneously hearing the audio file. The wireless portable can display the image file on a display in the portable device and play the embedded audio data over one or more speakers in the portable device.

The system's software and applications run on a mobile device processor which could be a wearable computing devices (i.e., Google glass, watches etc), portable tablet, smartphone, or laptop.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Particular embodiments of the present invention will now be described in greater detail with reference to the figures.

Figure 1:
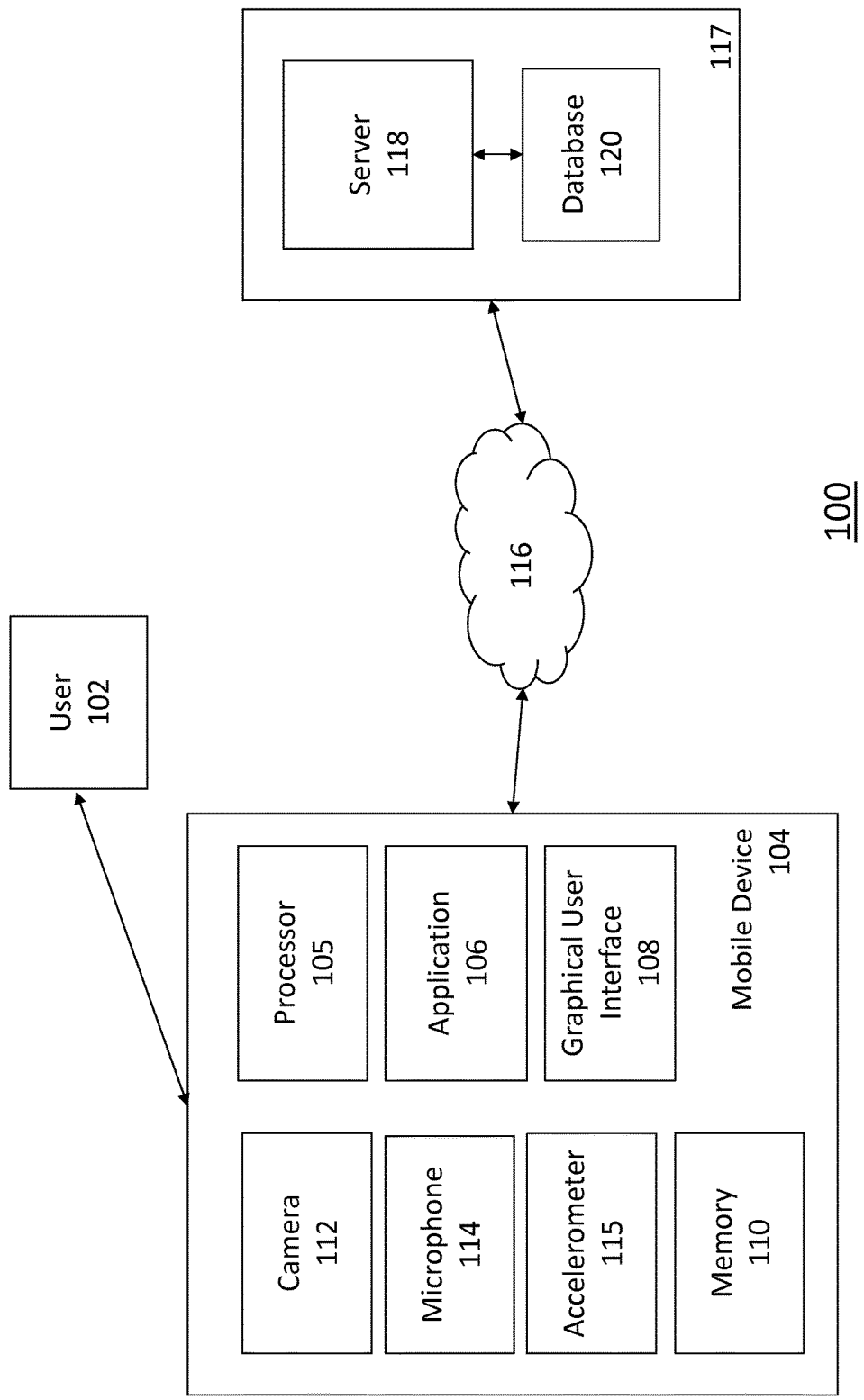
FIG. 1 depicts a system diagram of an exemplary system of the present invention.

As shown in FIG. 1, the present invention provides a system 100 for use by a user 102 through interaction with a mobile device 104. The mobile device 104 comprises a processor 105, a mobile application 106, a graphical user interface 108, memory 110, a camera 112, a microphone 114, and an accelerometer 115. The mobile device 104 may connect to a remote processing system 117 through one or more connections 116. The connection 116 may be through a telecommunication network, Wi-Fi, Bluetooth or other connection method. The mobile device 104 is a processor based device such as a smartphone, wearable computing device or tablet, which includes software application 106.

The remote processing system 117 may be comprised of one or more servers 118 and one more databases 120 which may be cloud-based. The servers 118 can be any processor based device which can be connected to remotely. The remote server 118 has one or more applications resident on the server 118 for processing data, such as image and audio data. The remote server 118 may also be connected to other servers or processor based devices for running the various applications or processing data. The remote system 117 may also be used to access the images and audio files by third parties using other computers and wireless devices.

In addition, various applications, software, and programs may reside on the one or more servers 118. These applications, software, and programs resident on the mobile device 104 or on the remote processing system 117 enable for the processing of the audio and image data. The user 102 may access these applications 106 through their mobile device 104 and/or through the Internet, local network, wide network, or telecommunication network 114.

The system and method of the present invention allows for users of the system's mobile application 106, executing on at least one processor 105 of the mobile device 104 to interact with the camera 112 and microphone 114, to simultaneously capture an audio signal and an image or video capture; and then to process and embed or store the digital audio data in association with the image data.

In the preferred embodiment, the application 106, on the mobile device 104, converts the image and audio file into BASE64 encoding or other similar binary to text encoding. The application 106 then posts the encoded image and audio file to the online application resident on the server 118 of the remote system 117. Such action might employ a JSON POST such as through an HTTP post to send or receive as a string of data. The string of data may include the encoded image or video, the audio, user credentials and metadata. The remote application resident on the server 118 creates a request object using the JSON data and the remote application converts or decodes the encoded (i.e. BASE64) image data and audio data back to its original format. The remote application then uploads the data to a cloud environment for sharing. The remote application may use a paperclip framework to upload the data to a cloud environment such as an Amazon AWS bucket. The remote application also creates a unique URL (uniform resource locator) for the audio and image files and saves them into an object file associated with the remote application on the server 118 and associated with the local application 106 on the mobile device 104. The URLs can In the preferred embodiment, the audio file and image file are separate files with an associated unique identification element used by the application 106 on the mobile device, or by the application running on the remote server 118 which can retrieve the appropriate audio file associated with the appropriate image file. Further, in the preferred embodiment, the image file may be created by using one frame of a video stream. Such video capture helps to eliminate any sounds associated with the actual capture of the image such as the shutter sound created from the camera hardware. The image and audio files are saved locally in the memory 110 of the mobile device 104 as an object of the application 106. Upon obtaining access through network 116 to the remote system 117, the files and encoded data are transmitted.

In an alternative embodiment, the audio and image data are captured and the audio file data is encoded and embedded into the image file or the image file is encoded and embedded into the audio file. In such embodiment, the embedded file may be opened for viewing and the captured audio file will be played back while the image is viewed.

The process of capturing audio data is triggered when the system 100 detects common events that are associated with a user capturing a still image. Various actions may trigger the recording of the audio data surrounding the capturing of a still image. For example, the recording of the audio data may be triggered when the user open the system's mobile application 106 and begins to focus the camera, utilizes the camera's zoom function, or clicks the image capture button. Additionally, the recording of the audio data may be triggered when the camera itself automatically adjusts its focus, detects objects such as faces, or audio clues. In the preferred embodiment of the present invention, the system will utilize the mobile device's accelerometer 115 to detect changes in orientation and thus trigger the capture of audio data associated with the still image.

For example, when the application 106 is opened, the mobile device 104 is usually in a horizontal position almost parallel to the ground. When the user decides to take a picture, he or she will usually move the mobile device 104 from this horizontal position to a vertical position perpendicular the ground. The accelerometer would recognize this abrupt movement of the mobile device from a horizontal position to a vertical position thus initiating the system's recording of audio data. If the user wants to take another picture, the user may shake the mobile device so that the accelerometer recognizes that another picture is imminent thus initiating the stoppage of the first audio track and the initiation of the second audio track or recording.

In another embodiment, the recording of the audio data is voice activated. For example, the system 100 recognizes verbal commands, such as "start", "record", and "next". Furthermore, the system is programmed to trigger audio recording when it detects common phrases said by a photographer such as "say cheese" or "smile".

In an alternative embodiment of the present invention, the capturing of the audio data is manually manipulated by the user by utilizing several capture modes. In a first capture mode, the click of the capture button simultaneously captures the still image and initiates the capture of the audio data for a predetermined time. In a second capture mode, the user can press and hold the capture button to capture the still image and audio data. When the button is released the system stops recording the audio data. In a third alternative capture mode, the user initiates the audio recording by pressing the capture button, but does not capture the image until the button is released. In a fourth capture mode, the audio and image is captured when a button is released. In another capture mode, the user needs to press the capture button three times to initiate the audio recording, and then to capture the still image, and finally to end the audio recording.

In an alternative embodiment, the capturing of the audio begins immediately when the application is opened. However, the system will only save the audio data that occurs during a predetermined amount of time before and after the picture is captured depending of the user settings or preferences (i.e. 5 seconds before and after the image is captured).

The image may be, but is not limited to, a standard picture, a panoramic picture, a burst image, or a combination of an image captured simultaneously using the front and back camera 112 of a mobile device 104. Furthermore, the user 102 may take several pictures in a given time frame and associate or embed the audio clip with all of the images. Also, the user 102 may take several pictures within a given time frame to instantaneously develop an image collage and saving that collage as one embedded audio image.

In an alternative embodiment, as the still image and audio data are simultaneously recorded, the system 100 instantaneously associates and embeds at least a portion of the audio data with the still image data and stores this captured data on the same media by utilizing a computerized process as an embedded audio image. In the present invention, that media will be an image database 110 located in the memory of the mobile device 106 containing the mobile application 106 or a remote cloud-base server 118. This process is instantaneous and does not require post-processing of the audio and image data captured in order to associate the data. In another embodiment of the present invention, the audio and image data may be captured and converted into a video file. By way of example, if the user wanted to upload a picture or series of pictures to a video site (i.e. YouTube) or if they wanted to send them via an SMS/text message to someone who does not have the application installed, the application would convert the audio and image file into a video file and transmit only the video file. Furthermore, in another embodiment, the image data and the audio date could be stored separately in two distinct files, which are synced to initiate or open simultaneously.

The embedded audio image can be played back on the mobile device 104 that captured the data or another third-party device. The user can view the embedded audio image by viewing through the mobile application's 106 GUI 108 such as in an album book. By opening the album, the user 102 may advance through each embedded audio image at his or her own pace. The user 102 will have the option for the audio to automatically play when the image is displayed or manually initiate the audio portion of the image.

The mobile or web application 106 will also contain a slideshow function where each image is displayed based on the length of sound recorded for each picture. The user 102 will be able to customize the slideshow by changing its speed as well as the type of transition that occurs. Additionally, the user 102 may save a slideshow and share it with third parties.

In another embodiment, the present invention will allow users 102 to edit the image data and audio data of the embedded audio image. For example, the user 102 may add filters to the image as well as crop, remove redeye, and brighten an image. Furthermore, the user 102 can edit the audio data in various ways including but not limited to cropping portions of the audio, changing the tone of the audio or the play back rate of the audio to give the recorded sound a "slow motion" feel. Additional methods to edit and manipulate image and audio data may also be used.

The present invention also allows for users to share with third-parties the embedded audio image with third parties by exchanging data through WiFi, Bluetooth, IrDA, TCP/IP, and other communication protocols. For example, the embedded audio image may be emailed, texted, tweeted, shared via AirDrop as well as posted on social networks such as Google+, Facebook, Pinterest, and Flickr. In another embodiment of the present invention, third parties that receive the shared embedded audio image through the mobile application or web application may verbally (or text) comment on the embedded audio image by recording additional audio data. This additional audio data may modify the existing embedded audio image file or create a second embedded audio image file. The new or modified file can then be shared with the original sender or other third parties. Furthermore, when a new audio comment is created the system may automatically notify the send and others that are tagged in the embedded audio image. This allows the photographer to hear reactions to the embedded audio image. Further, in addition to the audio capture, the mobile application can capture a video or image of the viewer when they see the embedded audio image.

In another embodiment, the system may include a verbal tagging mechanism. This mechanisms allows users to verbally tag third parties in the embedded audio image during the recording of the embedded audio image, immediately after the picture is taken or anytime thereafter. Anyone can be tagged in the embedded audio image, including but not limited to third parties that are in the picture or third parties who the user wants the embedded audio image to be automatically sent to. For example, once the picture is captured and the recording is complete, the user can say "tag Mary" or "tag Jack" and that information is then associated with the embedded audio image for future playback. Furthermore, the system may also communicate with the user's mobile device's contacts to acquire contact information for third parties and transmit the embedded audio image file to such users.

In another embodiment of the present invention, the user will have the opportunity to set up and join groups based on location, interests, and social network connections (e.g. Facebook friends). For example, one user can set up group for a wedding day where all the attendees can snap embedded audio images and instantaneously share them with the group. Further, an additional embodiment of the present invention allows users to locate and identify pictures based on voice recognition. By detecting a voice and reading the signature of the voice, the system can find pictures in the system which contain the voice.

Figure 2:
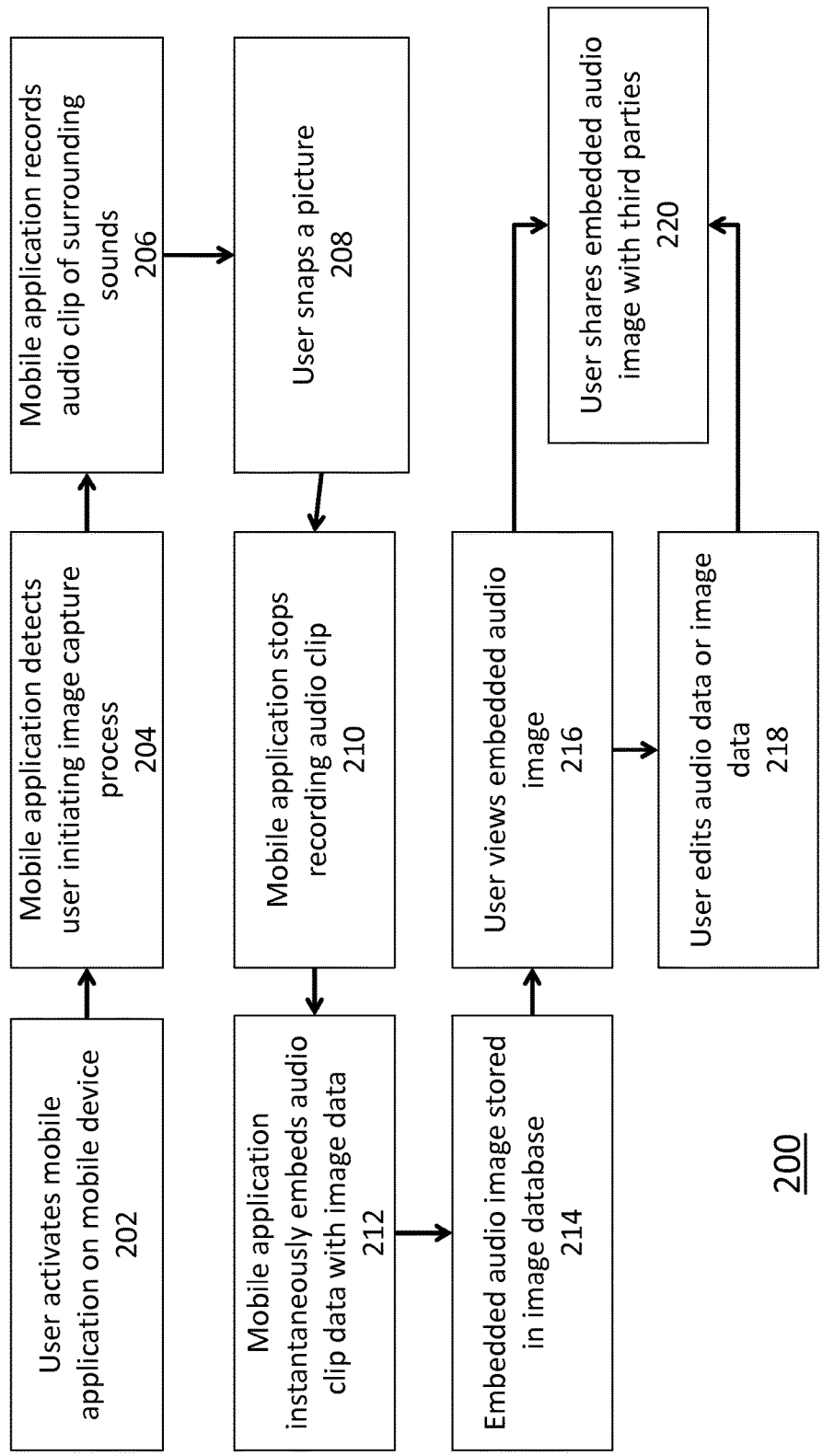
FIG. 2 is a flowchart diagram showing the process by which a user can capture, store, and share an image with embedded audio data.

FIG. 2 is a flowchart of the method 200 of the present invention for simultaneously capturing, embedding, storing, editing, and sharing digital audio data in association with still image data. First, in step 202, a user activates the mobile application on a mobile device. In step 204, the mobile application detects that the user is in the process of taking a picture, thus triggering the recording, step 206, of an audio clip of the surrounding sounds associated with this moment. After the audio clip begins recording, the user can simultaneously snap a picture, step 208, using at least one of the mobile device's cameras. Once a picture has been taken, in step 210, the mobile device will stop recording the audio clip, and the mobile application will, in step 212, instantaneously embed the audio data into the image data, or associate the audio data with the image data, and stores, step 214, the embedded audio image in a memory database. Subsequently, in step 216, the user can then view the embedded audio image. Once viewed, the user can edit the audio data or image data, step 218, or share it with third parties, step 220.

Figure 3:
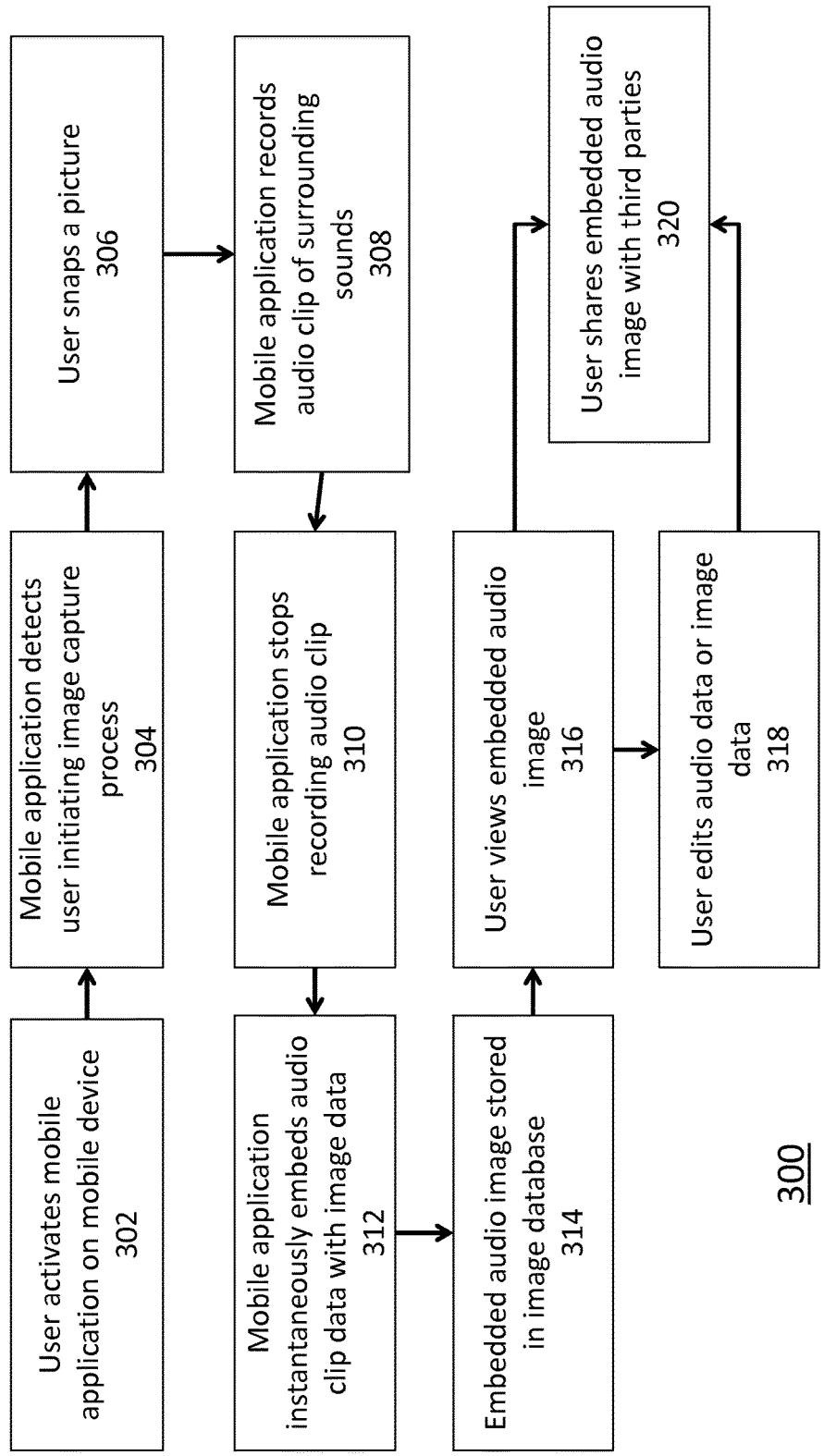
FIG. 3 is a flowchart diagram showing an alternative embodiment of the process by which a user can capture, store, and share an image with embedded audio data.

FIG. 3 is a flowchart of an alternative embodiment of the method 300 of the present invention for simultaneously capturing, embedding, storing, editing, and sharing digital audio data in association with still image data. First, in step 302, a user activates the mobile application on a mobile device. In step 304, the mobile application detects that the user is in the process of taking a picture. In step 306, the user snaps a picture using at least one of the mobile device's cameras, thus triggering the recording, step 308, of an audio clip of the surrounding sounds associated with this moment. Once a picture has been taken, in step 310, the mobile device will stop recording the audio clip after a predetermined amount of time, and the mobile application will, in step 312, instantaneously embed the audio data into the image data, or associate the audio data with the image data, and stores, step 314, the embedded audio image in a memory database. Subsequently, in step 316, the user can then view the embedded audio image. Once viewed, the user can edit the audio data or image data, step 318, or share it with third parties, step 320.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A portable device comprising:
an audio input device operative to capture audio signals;
an image input device operative to capture an image;
a motion detection device operative to detect motion of the portable device and, in response to detecting motion, output a detection of motion signal, and
a processor connected to the audio input device, the image input device, and the motion detection device, and
operation of the portable device includes:
the processor initiating capturing of audio signals by the audio input device upon receiving a detection of motion signal by the motion detection device;
the detection of motion signal being generated based on motion experienced by the portable device that is ancillary and associated with a user manipulating the portable device in connection with capturing the image; and
the audio input device continuing to perform the capturing of audio signals over the course of a time window, and
the processor receiving input from a user to capture the image,
the processor, based on the input, initiating the capture of the image by the image input device;
the image input device capturing the image;
the processor storing the image on the portable device;
the processor terminating the capturing of the audio signals resulting in termination of the time window in which audio signals are captured,
such that (a) the initiating the capturing of audio signals and (b) the terminating the capturing of audio signals, defines the time window so as to capture audio over a time spanning the image input device capturing the image; and
the processor saving the captured audio on the portable device.

2. The portable device of claim 1, wherein the audio input device comprises a microphone.

3. The portable device of claim 1, wherein the image input device comprises a camera.

4. The portable device of claim 1, wherein the motion detection device is an accelerometer.

5. The portable device of claim 1, wherein the processor embeds audio data into the image file.

6. The portable device of claim 5, wherein the portable device displays the image on a display in the portable device and plays the embedded audio data over one or more speakers in the portable device.

7. The portable device of claim 1, the portable device being wireless.

8. A portable device comprising:
an audio input device operative to capture audio signals;
an image input device operative to capture an image;
a detection device operative to detect an event of the portable device and, in response to detecting the event, output a detection signal, and
a processor connected to the audio input device, the image input device, and the detection device, and
operation of the portable device includes:
the processor initiating capturing of audio signals by the audio input device upon receiving a detection signal by the detection device;
the detection signal being generated based on an event experienced by the portable device that is ancillary and associated with a user manipulating the portable device in connection with capturing the image; and
the audio input device continuing to perform the capturing of audio signals over the course of a time window, and
the processor receiving input from a user to capture the image,
the processor, based on the input, initiating the capture of the image by the image input device;
the image input device capturing the image;
the processor storing the image on the portable device;
the processor terminating the capturing of the audio signals resulting in termination of the time window in which audio signals are captured,
such that (a) the initiating the capturing of audio signals and (b) the terminating the capturing of audio signals, defines the time window so as to capture audio over a time spanning the image input device capturing the image; and
the processor saving the captured audio on the portable device.

9. The portable device of claim 8, the detection device is constituted by a motion detection device.

10. The portable device of claim 9, the event including the user moving a camera, and the detection device detecting such moving the camera.

11. The portable device of claim 8, the event including the user focusing a camera, and the detection device detecting such focusing the camera.

12. The portable device of claim 8, the event including the user utilizing a camera zoom function of the portable device, and the detection device detecting such utilizing the camera zoom function.

13. The portable device of claim 8, wherein the image input device comprises a camera.

14. The portable device of claim 13, the event including an operation of the camera, and the detection device detecting such operation of the camera.

15. The portable device of claim 14, the operation of the camera constituted by the camera automatically adjusting focus.

16. The portable device of claim 14, the operation of the camera constituted by the camera detecting an object.

17. The portable device of claim 8, wherein the audio input device comprises a microphone.

* * * * *